Sept. 23, 1958 B. W. RIVKIN 2,853,042

MAGNETIC TAPE INDEXING MEANS

Filed Feb. 18, 1957

*INVENTOR.*
BERNARD W. RIVKIN
*BY*

United States Patent Office 2,853,042

Patented Sept. 23, 1958

2,853,042

MAGNETIC TAPE INDEXING MEANS

Bernard W. Rivkin, East Meadow, N. Y., assignor to Datrel Company, Incorporated, Hempstead, N. Y., a corporation of New York Application February 18, 1957, Serial No. 640,735

5 Claims. (Cl. 116—114)

This invention relates to magnetic tape recordings and more particularly to means for indexing portions of the recorded tape.

Magnetic tape recording has become very popular since large quantities of recorded material may be stored in a relatively small space. For instance, a reel of tape approximately a half inch wide and five inches in diameter will play or record for an hour and a half. Magnetic recordings are also used for business purposes, for instance, sales reports, conferences, speeches, and the like.

One of the major difficulties in using the magnetic tape is that of indexing so as to be able to find a particular short selection or memorandum which may be in the middle of the tape. If it is necessary to play the whole tape through in order to find a desired three minute portion, it may be necessary to spend an hour or more just to reach the desired portion. It is, therefore, necessary to have some kind of indexing so that the tape may be quickly run off at high speed to the approximate position of the desired portion and then played at the listening speed.

The indexing means must be something that is easy to apply to the magnetic tape which is generally of a plastic base and the dimensions and design of the indexing means must be such that it can be run rapidly on and off reels without fouling the tape. It is also necessary that the indexing means be non-magnetic since a magnetic material would cause unnecessary noise in the reproduction.

The present invention provides means for indexing portions of magnetic tape, comprising indexing guides or tabs which may adhere to the tape at any desired point. The dimensions of the tabs and the flexibility thereof is chosen so that the tabs, when mounted on the tape, may be run on and off the reels at very high speed without fouling or tangling the tape. In other words, the tabs must be flexible enough to bend between the roll of tape and the reel but must not fold under and back into the roll. The tabs may have identifying numbers or letters, or colors correlated to more complete descriptions applied to the reel and also to card information forms, or labels, which may be mounted in a convenient place, for instance, in the reel storage box.

Accordingly, a principal object of the invention is to provide new and improved indexing means for magnetic recording tape.

Another object of the invention is to provide new and improved indexing means for magnetic recording tape comprising tabs having strength and flexibility sufficient to permit very rapid winding and unwinding of the reels.

Another object of the invention is to provide new and improved magnetic recording means including a reel, a roll of tape, and means for indexing portions of the roll and means for correlating the information to the reel.

These and other objects of the invention will be apparent from the following specification and drawings, of which:

Referring to the figures, the magnetic tape roll 1 is generally mounted on a plastic reel 2 which is commonly transparent and which contains a number of openings 3 and 4 separated by spokes 5 and 6.

Figure 2:
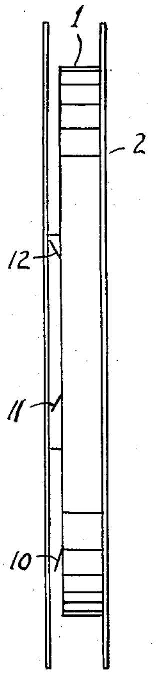
Figure 2 is a side view of the embodiment of Figure 1.

Referring to Figure 2, the magnetic tape roll 1 occupies most of the space between the sides of the reel 2 so that there is only about one-sixteenth of an inch or less to accommodate the indexing means or tabs 10, 11, and 12. The tabs must, therefore, be flexible so as to fit in the required space. However, they must be strong enough so as not to bend back and interfere with the succeeding turns of the roll since the tape is reeled at very high speed and any breaking or tangling of the tape generally results in the complete loss of the entire roll or a great portion thereof.

Since there is so little space for the tabs, it is desirable that the tabs be shaped with a tapering leading edge against the side of the reel, for instance, semicircular or triangular in shape, so that there will be a cam action between the tabs and the side of the reel which tends to locate the roll slightly away from the side. It is recommended that the tabs be placed on one side of the roll except in the case of dual track recorders which carry different information on the two sides of the tape. If the tabs are mounted on both sides of the roll, the dimensions should be somewhat smaller than if they are mounted on only one side.

The procedure for making the tape guides would be as follows: The base material would be printed in sheet form. The sheets will be strip glued with a pressure sensitive adhesive. Then the sheets would be mounted on a glassine or equivalent backing paper, and then die-cut through the tab material. The backing is not die-cut. The material is preferably a strong plastic material such as Mylar, cellophane, plasticized paper, or some other equivalent flexible non-shedding material. By non-shedding material is meant a tough material that will not flake or tear along the edges.

Figure 3:
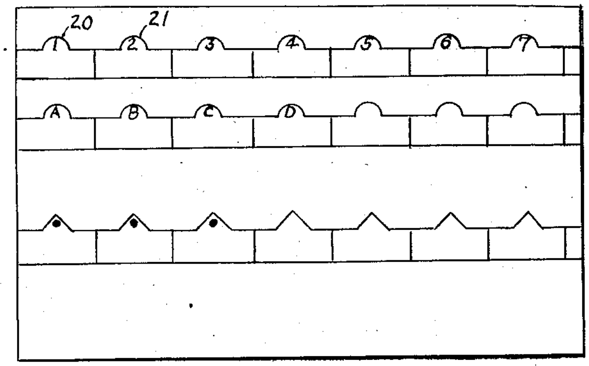
Figure 3 is a plan view illustrating the process of making the invention.
Figure 4:
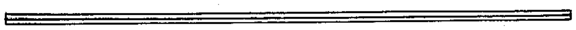
Figure 4 is a side view of Figure 3.

Figure 3 shows the tabs printed in sheet form. The projections 21, 20, should have tapering edges from both sides to provide the necessary cooperation between the tabs and the reel discussed above. The coating of an adhesive, preferably of a pressure sensitive type, is placed in strips, for instance with a roller, on the under side of the body portion, but not on the extension portions. The sheets may be fabricated in continuous roll form.

The tabs are applied to the magnetic tape at any desired position during the recording operation merely by stopping the recorder, removing the first tabs from the sheet, and sticking it on to the magnetic recording tape.

Since the index marks are only numbers or single letters due to the limitation of space, it will be necessary in most cases to make up a card or label which may be stored with the tape, or to affix information strips onto the reel itself, such as the strips 22 and 23. These strips may be of any material which will accommodate writing or marking of some kind. If they are provided in rolls, they may even be printed.

Figure 5:
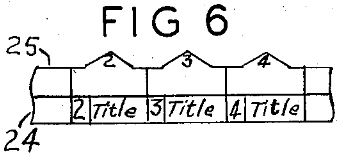
Figure 5 is a plan view of another embodiment of the invention.

Alternatively, the marking strips 22 and 23 could be cut out of the same strip as the indexing tabs 20 and 21. In that case the complete title could be written on the strip 24 as shown in Figure 5. In that case the user writes in the title and then both portions 24 and 25 may be removed from the backing, the tab 25 applied to the tape and the strip 24 applied to the reel. Both the tab and the strip have the same correlating index number.

Figure 1:
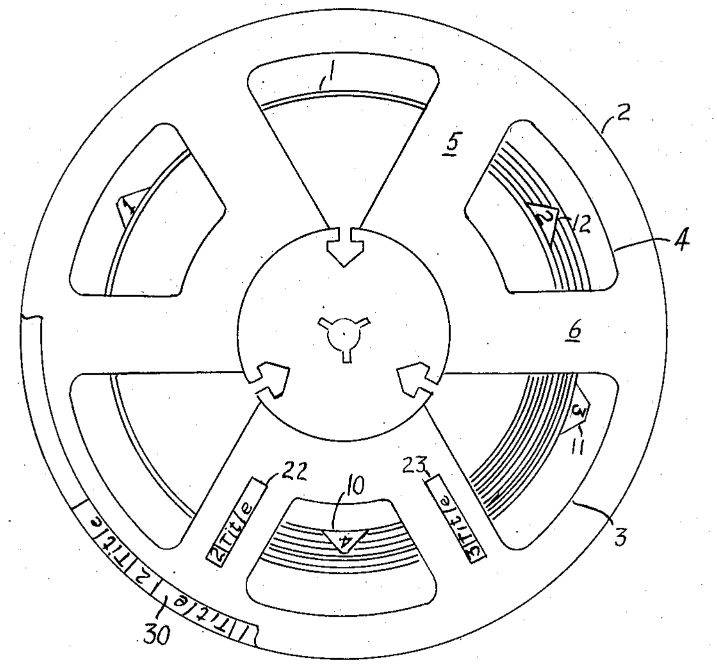
Figure 1 is a plan view of an embodiment of the invention illustrating the use thereof.

Alternatively, the information strips may be written on an adhesive strip which is placed on the side of the reel adjacent the outer circumference as shown at 30 in Figure 1.

The tabs or guides may be spliced into the tape or may be used to splice pieces of the tape together. This would be particularly useful when editing, as the indexing would be automatically done.

The tabs may be made with a fold or crease line made at the bending line so that they will fold evenly in a predetermined direction. The tabs may have the index numbers printed on both sides if desired, but this would not be necessary if a crease line is put on.

Figure 6:
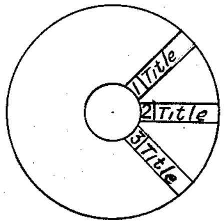
Figure 6 is a plan view of another embodiment of the invention.

Figure 6 shows a circular label which would utilize the center portion of the reel for listing titles. Alternatively, a numbered label for titles may be used which is dimensioned to be mounted inside the corner of the reel storage box.

In using the system of the present invention, when it is desired to re-use the tape, the tabs may be easily removed or a different color set of tabs may be used for the new recording, and the old tabs left on if it is not desired to go to the trouble of removing them. However, it would be preferable to remove the old tabs.

I claim:

1. In combination with a flexible magnetic recording tape adapted to be wound on and unwound from a reel, indexing means comprising a tab of a non-magnetic flexible material, said tab including a body portion and an extension on an edge of the body portion, said body portion having a coating of adhesive on the undersurface thereof for securing the body portion to the tape with the extension extending laterally of the tape, said extension having leading and trailing edges tapering towards each other thereby providing cam surfaces for engagement with a reel whereby the extension will flex into angular relation to the body portion for disposal between the roll of tape on a reel and the reel for permitting high speed winding and unwinding of the tape, said extension being provided with distinguishable indicating means.

2. The combination of claim 1 wherein the degree of flexibility of the tab is generally the same as the flexibility of the tape whereby the tab may move through a recorder-reproducer head without effect upon the head or the tape.

3. The combination of claim 2 wherein the body portion of the tab has a width less than the width of the tape.

4. The combination of claim 2 wherein the tab is provided with a removable strip being provided with identical distinguishable indicating means as provided on the extension, said strip also having indicia thereon designating the material on the tape at the point of attachment of the tab.

5. An indexing tab adapted to be attached to the surface of a magnetic recording tape, said tab including a body portion and a lateral extension, said body portion having one surface thereof coated with adhesive for detachably mounting the body portion on the tape, said extension having inwardly tapering edges defining cam edges whereby the extension will be flexed into angular relation to the body portion when the extension passes obstructions adjacent the side edge of the tape without interference to the movement of the tape.

References Cited in the file of this patent

UNITED STATES PATENTS

| | | |
|---|---|---|
| 876,767 | Boggs | Jan. 14, 1908 |
| 1,151,475 | Kingsley et al. | Aug. 24, 1915 |
| 1,614,838 | Gorin | June 18, 1927 |
| 1,803,241 | Finkel | Apr. 28, 1931 |
| 1,848,098 | Aligner | Mar. 8, 1932 |
| 2,853,098 | Tompkins | Apr. 12, 1932 |